United States Patent Office 3,027,403
Patented Mar. 27, 1962

3,027,403
TRINITROPROPYL ACETATE AND PROCESS
Pliny O. Tawney, Passaic, and Irwin J. Schaffner, Waldwick, N.J., assignors to United States Rubber Company, New York, N.Y., a corporation of New Jersey
No Drawing. Filed June 22, 1949, Ser. No. 100,750
3 Claims. (Cl. 260—488)

The subject of this invention is a new compound, 1,1,1-trinitro-2-propyl acetate and a method of making same.

Although nitro-aliphatic compounds have been proposed for the formulation of explosives, their number and types have been restricted by the lack of a simple method for introducing a multiplicity of nitro groups into the compound and by the frequent instability of the products.

We have now unexpectedly discovered that trinitromethane will react with vinyl acetate in the presence of boron trifluoride as catalyst to form an addition reaction product containing one mol of each of the reactants. Although this new compound is explosive, it is surprisingly stable to the ordinary mechanical and thermal shocks encountered in handling, packaging and shipping.

The reaction may be illustrated by the following equation:

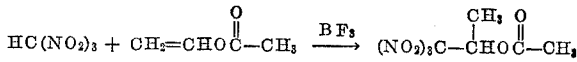

In the typical practice of our invention, approximately equimolar proportions of trinitromethane and vinyl acetate are reacted under anhydrous conditions in the presence of a boron trifluoride catalyst. While boron trifluoride itself may be used as the catalyst, for handling ease it is preferred to employ the boron trifluoride in the form of an addition product with a suitable organic material preferably diethyl ether. It is preferred to carry out the reaction in an organic solvent reaction medium such as diethyl ether and to conduct the reaction by heating under reflux until it has attained the desired degree of completion. It is preferable that the boron trifluoride-containing catalyst be present in amount equal to approximately one mol per mol of each of the reactants.

Following reaction, the addition product of our invention may be recovered from the reaction mixture by commingling with water in amount sufficient to decompose catalyst complexes, separating the organic layer and distilling to recover the solvent and the product as separate fractions. If desired, the product may be redistilled for greater purity.

The preparation of my new compound is illustrated in the following example. All parts are by weight.

*Example*

Seven and one half parts (0.05 mol) of trinitromethane are mixed with 7.1 parts (0.05 mol) of boron trifluoride etherate ($BF_3$—$(C_2H_5)_2O$). To this solution there is added 4.3 parts (0.05 mol) of vinyl acetate in 10.5 parts of anhydrous diethyl ether and the mixture is heated under reflux for two hours at approximately 52° C. The reaction mixture is shaken with water and the ether layer is separated, dried and distilled to yield 8.25 parts of a colorless liquid, B.P. 62–64° C./2 mm. On redistillation there are obtained 5.5 parts of a liquid, B.P. 56° C./1 mm., $n_D^{19} = 1.4432$. The analysis of this material corresponds to that required 1,1,1-trinitro-2-propyl acetate.

| | Percent C | Percent H | Percent N |
|---|---|---|---|
| Analysis: | | | |
| Found | 24.36 | 2.64 | 18.05 |
| Theory | 25.32 | 2.98 | 17.71 |

Having thus described my invention, what I claim and desire to protect by Letters Patent is:

1. As a new compound 1,1,1-trinitro-2-propyl acetate.
2. The method which comprises effecting addition reaction of trinitromethane and vinyl acetate in the presence of boron trifluoride.
3. The process which comprises refluxing a mixture of substantially equimolar amounts of trinitromethane, vinyl acetate and a boron trifluoride-diethyl ether complex with diethyl ether as the reaction medium, commingling the resulting reaction mixture with water to decompose boron trifluoride complex present and recovering 1,1,1-trinitro-2-propyl acetate from the resulting mixture.

No references cited.